(12) United States Patent
Inoue et al.

(10) Patent No.: US 10,462,455 B2
(45) Date of Patent: Oct. 29, 2019

(54) DISPLAY APPARATUS, DISPLAY METHOD, AND COMPUTER READABLE RECORDING MEDIUM

(71) Applicant: NIKON CORPORATION, Tokyo (JP)

(72) Inventors: Hideya Inoue, Yokohama (JP); Hirohisa Taira, Ryugasaki (JP); Koji Yamagaki, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/286,588

(22) Filed: Oct. 6, 2016

(65) Prior Publication Data

US 2017/0026639 A1 Jan. 26, 2017

Related U.S. Application Data

(60) Division of application No. 13/762,391, filed on Feb. 8, 2013, now Pat. No. 9,488,841, which is a
(Continued)

(30) Foreign Application Priority Data

Aug. 10, 2010 (JP) .................................. 2010-179143
Aug. 10, 2010 (JP) .................................. 2010-179144

(51) Int. Cl.
G06K 9/00 (2006.01)
H04N 13/366 (2018.01)
(Continued)

(52) U.S. Cl.
CPC ............ *H04N 13/366* (2018.05); *G02B 27/22* (2013.01); *G06K 9/00* (2013.01); *G06T 15/20* (2013.01);
(Continued)

(58) Field of Classification Search
CPC .......... G02B 27/22; G06K 9/00; G06T 15/20; H04N 13/0018; H04N 13/0022;
(Continued)

(56) References Cited

U.S. PATENT DOCUMENTS 9,488,841 B2 * 11/2016 Inoue ................. H04N 13/0018
9,625,721 B2 * 4/2017 Nepveu ................ G02B 27/017
(Continued)

FOREIGN PATENT DOCUMENTS

CN 1643939 7/2005
CN 10567082 10/2009
(Continued)

OTHER PUBLICATIONS

International Search Report for corresponding International Application No. PCT/JP2011/004423, dated Oct. 25, 2011.
(Continued)

*Primary Examiner* — Tom Y Lu
(74) *Attorney, Agent, or Firm* — Mori & Ward, LLP

(57) ABSTRACT

A display apparatus includes a display section and a changing section. The display section displays an image that gives a stereoscopic perspective to an observer. The changing section changes an amount by which the stereoscopic perspective in the image displayed by the display section is enhanced according to a setting of the observer.

10 Claims, 7 Drawing Sheets

Related U.S. Application Data continuation of application No. PCT/JP2011/004423, filed on Aug. 4, 2011.

(51) Int. Cl.

| | | |
|---|---|---|
| *H04N 13/128* | (2018.01) | |
| *H04N 13/15* | (2018.01) | |
| *H04N 13/324* | (2018.01) | |
| *G02B 27/22* | (2018.01) | |
| *G06T 15/20* | (2011.01) | |
| *H04N 9/64* | (2006.01) | |
| *H04N 13/122* | (2018.01) | |
| *H04N 13/00* | (2018.01) | |

(52) U.S. Cl.
CPC ........... *H04N 9/646* (2013.01); *H04N 13/122* (2018.05); *H04N 13/128* (2018.05); *H04N 13/15* (2018.05); *H04N 13/324* (2018.05); *H04N 2013/0077* (2013.01)

(58) Field of Classification Search
CPC ........... H04N 13/0037; H04N 13/0422; H04N 13/0468; H04N 2013/0077; H04N 9/646
See application file for complete search history.

(56) References Cited

U.S. PATENT DOCUMENTS

| | | | |
|---|---|---|---|
| 2005/0069194 A1 | 3/2005 | Kagitani | |
| 2005/0089212 A1 | 4/2005 | Mashitani et al. | |
| 2006/0087507 A1* | 4/2006 | Urano | G06T 15/20 345/421 |
| 2009/0040138 A1* | 2/2009 | Takahashi | G02B 27/22 345/32 |
| 2009/0136148 A1 | 5/2009 | Lim et al. | |
| 2012/0019688 A1 | 1/2012 | Bugnariu et al. | |
| 2013/0094833 A1 | 4/2013 | Fujita | |
| 2013/0242063 A1* | 9/2013 | Matsumoto | H04N 13/363 348/51 |

FOREIGN PATENT DOCUMENTS

| | | |
|---|---|---|
| JP | 06-324620 | 11/1994 |
| JP | 10-191397 | 7/1998 |
| JP | 2003-209858 | 7/2003 |
| JP | 2004-221700 | 8/2004 |
| JP | 2004-289527 | 10/2004 |
| JP | 2005-18529 | 1/2005 |
| JP | 2005-110120 | 4/2005 |
| JP | 2007-110360 | 4/2007 |
| JP | 2007-264722 | 10/2007 |
| JP | 2009-251141 | 10/2009 |
| WO | WO 2011/162037 | 12/2011 |

OTHER PUBLICATIONS

International Preliminary Report on Patentability with Translation of Written Opinion of the International Searching Authority for corresponding International Application No. PCT/JP2011/004423, dated Mar. 21, 2013.
Japanese Office Action for corresponding JP Application No. 2010-179143, dated Dec. 10, 2013.
Chinese Office Action for corresponding CN Application No. 201180039376.8, dated Sep. 2, 2014.
Chinese Office Action for corresponding CN Application No. 201180039376.8, dated May 25, 2015.
Chinese Office Action for corresponding CN Application No. 201180039376.8, dated Sep. 28, 2015.
Non-Final Rejection issued by the U.S. Patent and Trademark Office for the parent U.S. Appl. No. 13/762,391, dated Feb. 9, 2015.
Final Rejection issued by the U.S. Patent and Trademark Office for the parent U.S. Appl. No. 13/762,391, dated Aug. 27, 2015.
Non-Final Rejection issued by the U.S. Patent and Trademark Office for the parent U.S. Appl. No. 13/762,391, dated Jan. 20, 2016.
Notice of Allowance issued by the U.S. Patent and Trademark Office for the parent U.S. Appl. No. 13/762,391, dated Jul. 7, 2016.
Indian Office Action for corresponding IN Application No. 1761/DELNP/2013, dated Apr. 27, 2018.

* cited by examiner

X→ENHANCING BLUE COMPONENT

DISPLAY APPARATUS, DISPLAY METHOD, AND COMPUTER READABLE RECORDING MEDIUM

CROSS-REFERENCE TO RELATED APPLICATIONS

The present application is a divisional application of the U.S. patent application Ser. No. 13/762,391 filed on Feb. 8, 2013, which is a continuation application of International Application No. PCT/JP2011/004423, filed on Aug. 4, 2011, which claims priority to Japanese Patent Application No. 2010-179143, filed on Aug. 10, 2010 and priority to Japanese Patent Application No. 2010-179144, filed on Aug. 10, 2010. The contents of these applications are incorporated herein by reference in their entirety.

BACKGROUND

1. Technical Field

The present invention relates to a display apparatus, a display method, and a computer readable recording medium.

2. Related Art

A stereoscopic image display apparatus shows a perspective image by providing parallax images to the right eye and the left eye of an observer. It often happens that different observers perceive the same stereoscopic image differently in terms of its stereoscopic perspectives. For example, even when the same 3D content is displayed, some people may feel stronger stereoscopic perspectives than others.

Patent Document No. 1: Japanese Patent Application Publication No. H6-324620

Patent Document No. 2: Japanese Patent Application Publication No. 2004-289527

A conventional stereoscopic image display apparatus has not performed processing to enhance or turn down the spatial effect to images received from outside, before displaying them on a display. It is preferable that the display apparatus display a stereoscopic image with such a stereoscopic perspective that would be felt adequate by each observer. However, because each observer perceives different stereoscopic perspectives, it is practically difficult to provide an image universally felt adequate by all the people.

SUMMARY

According to a first aspect of the innovations, a display apparatus includes a display section and a changing section. The display section displays an image that gives a stereoscopic perspective to an observer. The changing section changes an amount by which the stereoscopic perspective in the image displayed by the display section is enhanced according to a setting of the observer.

According to a second aspect of the innovations, a display method includes displaying an image from which an observer perceives a stereoscopic perspective. The method includes changing the amount of enhancement to be given to the stereoscopic perspective of the image displayed, according to a setting of the observer.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
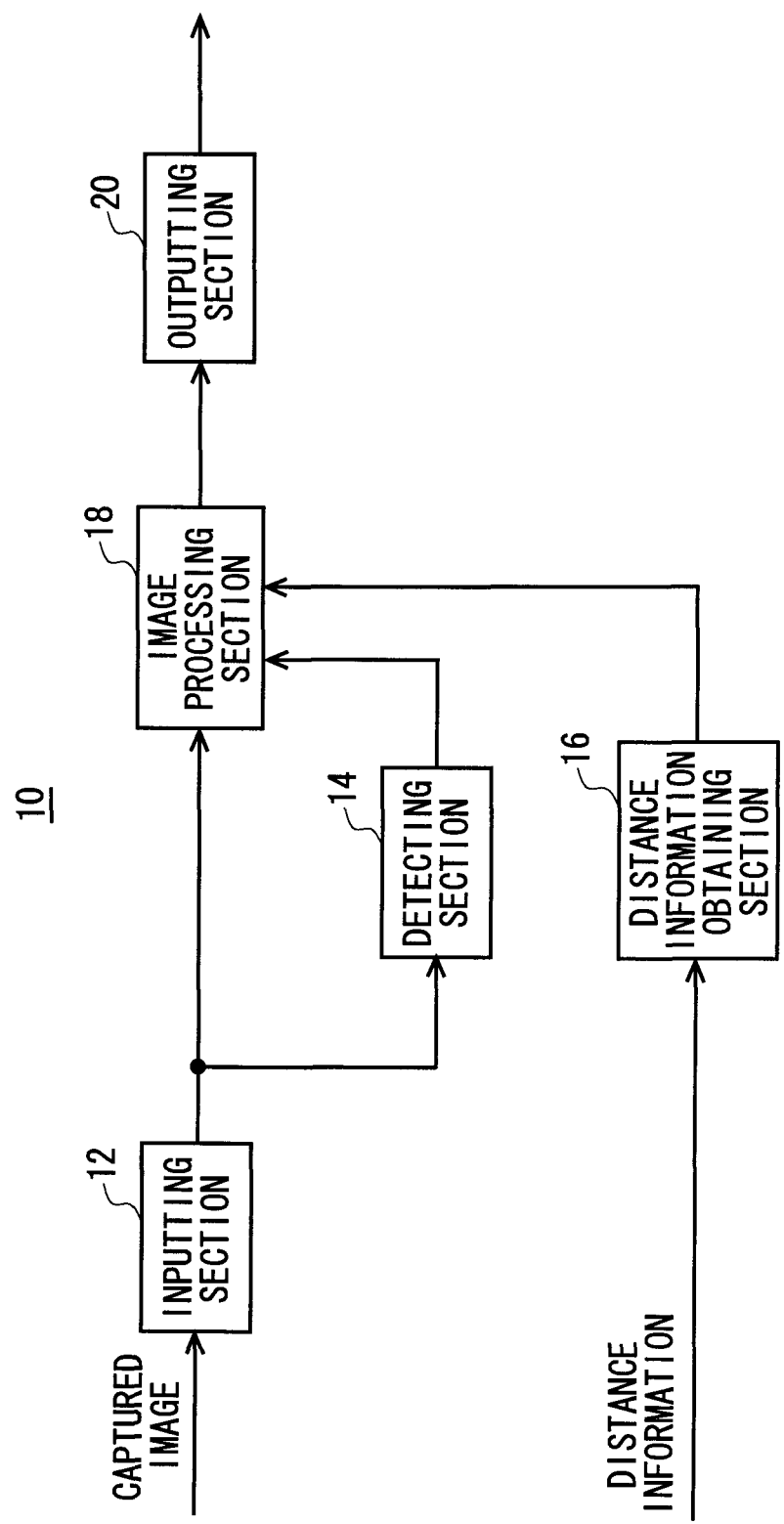
FIG. 1 shows a structure of an image processing apparatus 10 according to a first embodiment.

FIG. 1 shows a structure of an image processing apparatus 10 according to a first embodiment. The image processing apparatus 10 according to the first embodiment performs image processing to an image captured by a camera. For example, the image processing apparatus 10 is provided in an image inputting stage of a display apparatus. The image processing apparatus 10 may be provided in an image outputting stage of a camera.

The image processing apparatus 10 includes an inputting section 12, a detecting section 14, a distance information obtaining section 16, an image processing section 18, and an outputting section 20. The inputting section 12 inputs an image captured by a camera. For example, the inputting section 12 may read a captured image from a storage medium, or may demodulate a captured image transmitted from a broadcast station or the like.

The detecting section 14 detects a distance of a subject (subject distance) in each region of a captured image. The subject distance represents a distance between a camera and a subject at the time of image capturing.

For example, the detecting section 14 may calculate a subject distance in each region, depending on a ratio of a blue component of the region at the time of image capturing. When the subject distance is long when capturing an image of a landscape, the image takes on a more blue component than an original subject color, due to the effect of the air layer interposed between the camera and the subject. Therefore, the detecting section 14 can estimate the subject distance in each region of a captured image by determining the ratio of the blue component included in the region.

For example, the detecting section 14 calculates an average color of each region in a captured image, analyses the hue of the calculated average color, and calculates the ratio of the blue component that the average color contains. Then, the detecting section 14 may estimate the subject distance of each region, by determining it farther when its blue component ratio is larger.

The detecting section 14 may also calculate the subject distance of the subject, depending on the spatial frequency of the contour of the subject displayed on the captured image. For example, the subject whose subject distance is long when taking an image of a landscape will have a larger blur due to the effect of the air layer interposed between the camera and the subject. The detecting section 14 can estimate the subject distance in each region of the captured image according to the spatial frequency of the contour of the subject included in the region.

For example, the detecting section 14 extracts an edge portion of each subject in each region of a captured image, and calculates the spatial frequency of the extracted edge. Then, the detecting section 14 may estimate the subject distance of each region, by determining it farther when its spatial frequency is lower.

The distance information obtaining section 16 obtains distance information representing a subject distance in each section measured by a camera when it captures the image. For example, the distance information obtaining section 16 can obtain a depth map which is two-dimensional information that expresses a distance from a camera to a surface of a subject in a screen.

The image processing section 18 changes the distance perspective of the image of each region of a captured image according to the subject distance detected for the region.

For example, the image processing section 18 may change the distance perspective of the image of each region, by changing the blue component ratio of each region according to the subject distance of each region of the captured image detected by the detecting section 14. In an example, the image processing section 18 increases the blue component of each image of the captured image, by an amount according to the detected subject distance.

More specifically, the image processing section 18 may pre-set a reference value of the subject distance, and increase the blue component ratio of the region whose detected subject distance is larger than this reference value. For example, the image processing section 18 may set two reference values: 1 km and 10 km. Then, the image processing section 18 may increase the blue component ratio in such a manner as 20% increase for regions whose subject distance is between 1 km and 10 km, and 40% increase for the regions whose subject distance is 10 km or more.

For example, the image processing section 18 may change the distance perspective of the image of each region of the captured image detected by the detecting section 14, by blurring the region according to the subject distance of the region. The image processing section 18 blurs each region of the captured image by a blurring amount according to the detected subject distance for the region.

More specifically, the image processing section 18 may pre-set a reference value of the subject distance, and blur the image in regions whose detected subject distance is larger than this reference value. For example, the image processing section 18 may set two reference values: 1 km and 10 km. Then, the image processing section 18 may blur the image for regions whose subject distance is between 1 km and 10 km adopting a first blurring degree, and the regions whose subject distance is 10 km or more may be blurred adopting the second blurring degree.

By performing such processing, the image processing section 18 can widen the difference in distance perspective between the region whose subject distance is shorter and the region whose subject distance is longer. According to this processing, the image processing section 18 can enhance the sense of perspectives of a captured image.

The image processing section 18 may change the distance perspectives, by further based upon the distance information obtained by the distance information obtaining section 16.

For example, when the region whose distance obtained by the distance information obtaining section 16 is determined to be farther than a predetermined distance, the image processing section 18 may change the distance perspective of the image in the region according to the subject distance detected by the detecting section 14. For example, for the region detected by the distance information obtaining section 16 to be infinity, the image processing section 18 may change the distance perspectives of the image in the region according to the subject distance detected by the detecting section 14.

When the region whose distance obtained by the distance information obtaining section 16 is determined to be not farther than the predetermined distance, the image processing section 18 may change the distance perspective of the image in the region according to the subject distance obtained by the distance information obtaining section 16. For example, for the region detected by the distance information obtaining section 16 not to be infinity, the image processing section 18 may change the distance perspectives of the image in the region according to the subject distance detected by the distance information obtaining section 16. By doing so, the image processing section 18 can change the distance perspective of the image based on a wider range of subject distance, to further enhance the perspective.

The outputting section 20 outputs the captured image after having undergone image processing by the image processing section 18, to outside. When the image processing apparatus 10 is provided in a display apparatus, the outputting section 20 outputs the captured image whose perspective has been enhanced, to a monitor. When the image processing apparatus 10 is provided in a camera, the outputting section 20 stores, in a recording medium, the captured image whose perspective has been enhanced.

Figure 2:
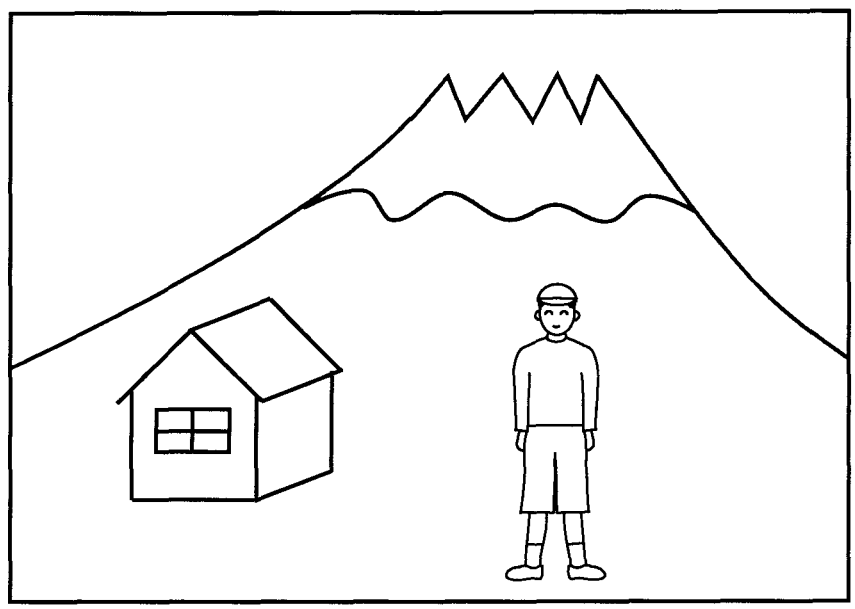
FIG. 2 shows an example of an originally captured image before undergoing image processing of the image processing apparatus 10 according to the first embodiment.
Figure 3:
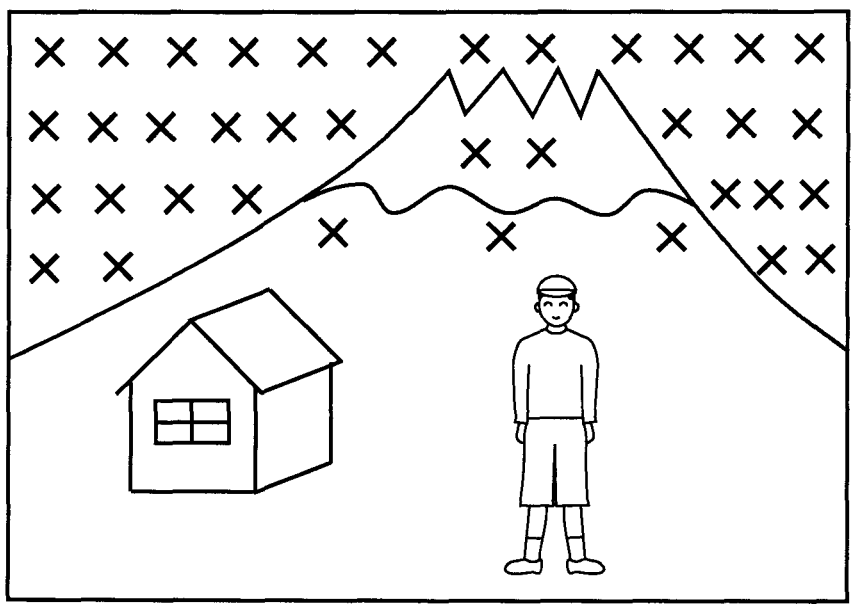
FIG. 3 shows an example of a captured image after having undergone image processing of the image processing apparatus 10 according to the first embodiment.

FIG. 2 shows an example of an originally captured image before undergoing image processing of the image processing apparatus 10 according to the first embodiment. FIG. 3 shows an example of a captured image after having undergone image processing of the image processing apparatus 10 according to the first embodiment.

FIG. 2 and FIG. 3 include a man (near view), a house (intermediate view), a mountain (distant view), and the sky (very distant view). In FIG. 3, the sign "x" shows the region in which the blue component ratio has been increased.

For example, the image processing apparatus 10 increases the blue component ratio for the mountain (distant view) and the sky (very distant view) contained in the image of FIG. 2. Furthermore, the image processing apparatus 10 increases the blue component ratio by a larger amount for the region of the sky (very distant view) whose subject distance is longer, than for the region of the mountain (distant view).

Instead of or in addition to increasing the blue component ratio, the image processing apparatus 10 may blur the mountain (distant view) and the sky (very distant view). The image processing apparatus 10 may blur the region of the sky (very distant view) whose subject distance is longer by a greater amount than the region of the mountain (distant view).

The captured image processed by the image processing apparatus 10 as described above can make an observer feel a greater difference in distance between the regions whose subject distance is near and the regions whose subject distance is long. This means that the image processing apparatus 10 can enhance the perspective of the captured image without changing the contour or the structural outline of the subject in the image captured by the camera as they are.

Figure 4:
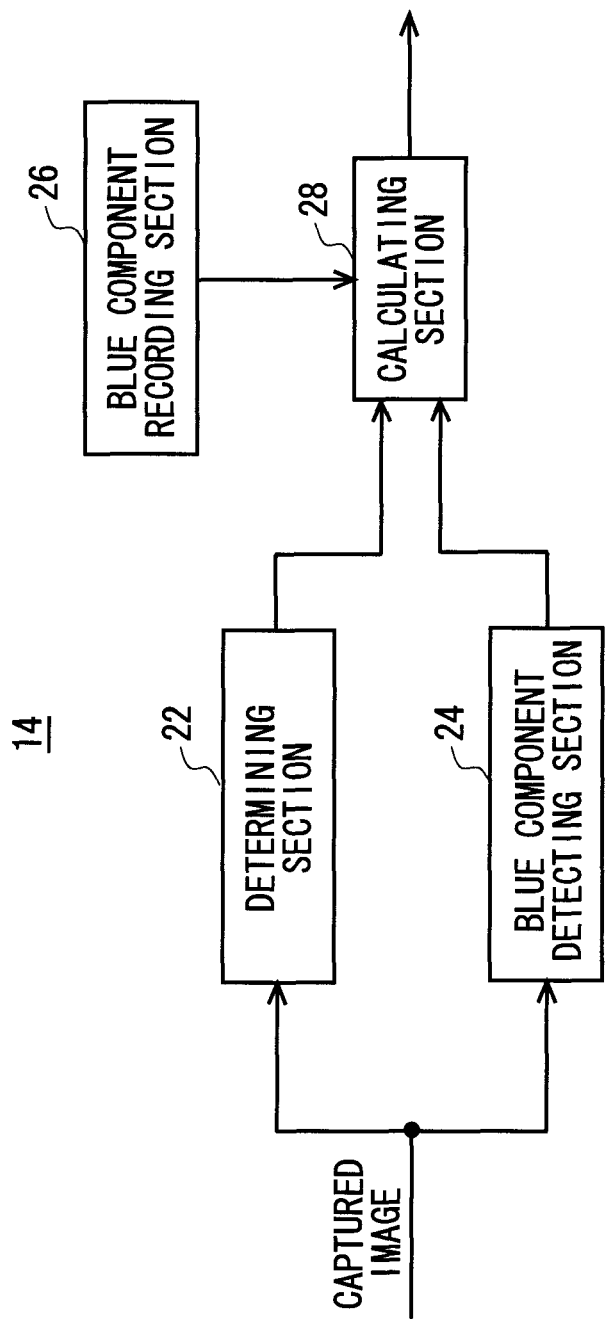
FIG. 4 shows an example of the configuration of a detecting section 14 according to the first embodiment.

FIG. 4 shows an example of the configuration of a detecting section 14 according to the first embodiment. The detecting section 14 may include a determining section 22, a blue component detecting section 24, a blue component recording section 26, and a calculating section 28.

The determining section 22 determines the type of a subject in each region of a captured image. The determining section 22 may compare a pre-registered image pattern with a subject included in a captured image, and determines the type of a subject included in the captured image.

The blue component detecting section 24 detects the blue component ratio of each region in the captured image. The blue component detecting section 24 may calculate, for each region, an average color of the region, and calculate the ratio of the blue component that the average color contains by analyzing the hue of the average color.

The blue component recording section 26 records the ratio of the blue component to be included in the image for each type of subject. For each type of subject detectable by the determining section 22, the blue component recording section 26 may record the ratio of the blue component that the color at the surface of the type of subject originally contains. The blue component recording section 26 may record values pre-recorded by a user.

The calculating section 28 reads, from the blue component recording section 26, the blue component ratio of the type of subject determined by the determining section 22. Next, for the blue component ratio for each subject recorded in the blue component recording section 26, the calculating section 28 calculates the difference between the ratio of the blue component ratio of the type of subject determined by the determining section 22 and the blue component ratio detected by the blue component detecting section 24. Then, the calculating section 28 calculates the subject distance in the region based on the calculated distance.

The calculating section 28 calculates whether the subtraction result of subtracting the blue component ratio for each subject recorded in the blue component recording section 26 from the blue component ratio detected by the blue component detecting section 24 is a reference value or more. Then, when the difference is smaller than the reference value, the calculating section 28 determines that the subject distance is at a shorter reference distance. When the distance is equal to or greater than the reference value, the calculating section 28 determines that the subject distance is at a reference distance or greater.

The detecting section 14 as explained above can accurately detect the subject distance, if the captured image contains the pre-registered type of subject.

Figure 5:
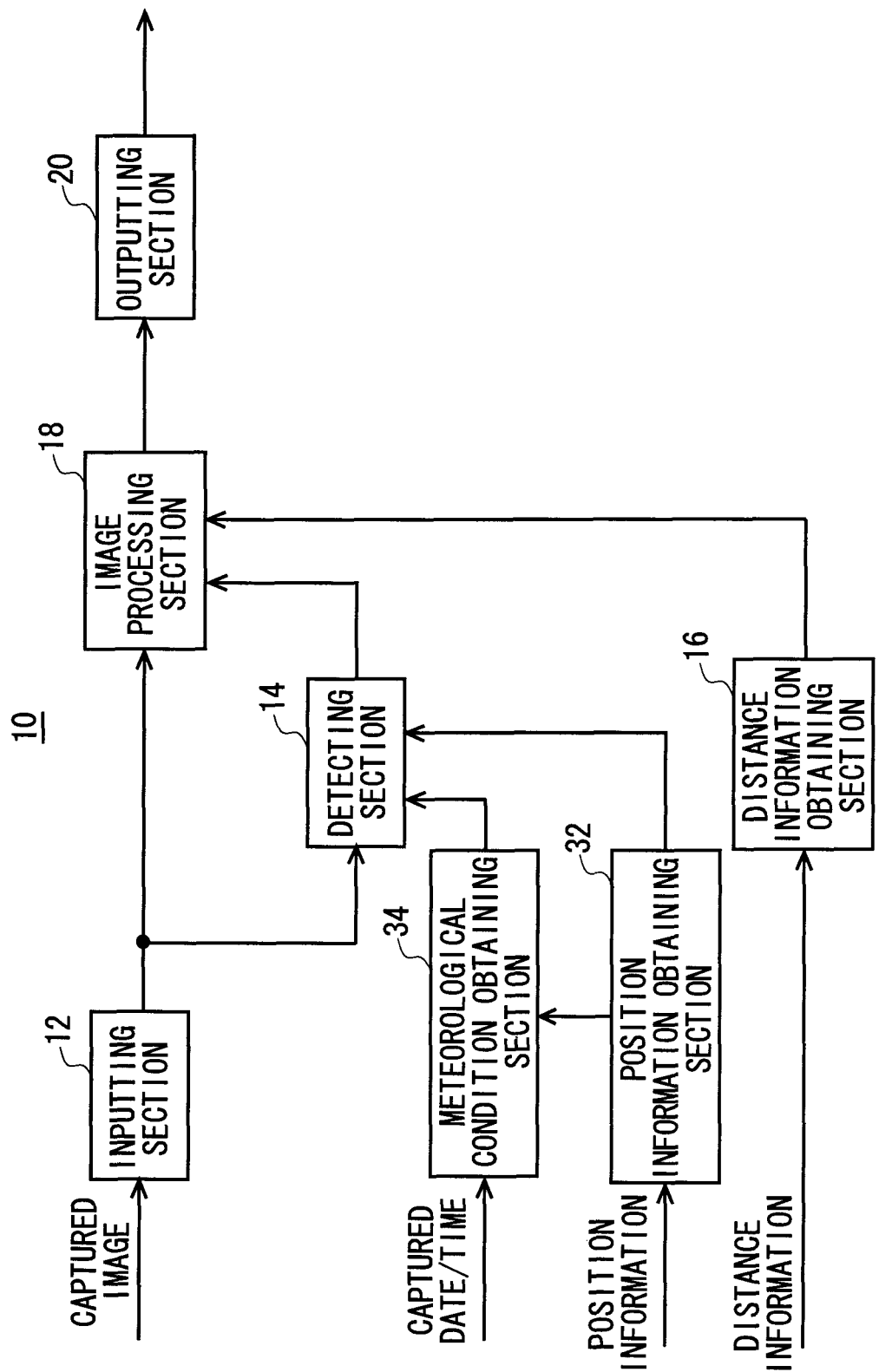
FIG. 5 shows a configuration of an image processing apparatus 10 according to a modification example of the first embodiment.

FIG. 5 shows a configuration of an image processing apparatus 10 according to a modification example of the first embodiment. The image processing apparatus 10 according to this modification example adopts substantially the same configuration and function as the image processing apparatus 10 shown in FIG. 1, and so the members having substantially the same configuration and function as in FIG. 1 are assigned the same reference numerals, and the following description focuses on the differences.

The image processing apparatus 10 according to this modification example further includes a position information obtaining section 32 and a meteorological condition obtaining section 34. The position information obtaining section 32 obtains the position information representing the position at which the image has been captured. For example, a camera equipped with a GPS (Global Positioning System) receiver can output a captured image added with position information showing the captured position. The position information obtaining section 32 obtains the position information included in the captured image having outputted from such a camera.

The meteorological condition obtaining section 34 obtains a meteorological condition at the time of capturing the image, based on the captured date/time of the image as well as the position information obtained by the position information obtaining section 32. For example, a camera can output a captured image added with a captured date/time. The position information obtaining section 32 obtains the captured date/time included in the captured image having outputted from such a camera. The meteorological condition obtaining section 34 obtains, for example through a network, the meteorological condition of the region that the position information obtained by the position information obtaining section 32 identifies.

The detecting section 14 according to this modification example detects the subject distance in each region of the captured image, according to the meteorological condition obtained by the meteorological condition obtaining section 34. For example, when it is sunny at the time of capturing an image, the contour of the subject whose subject distance is long can be clearly caught because of clear air. Conversely, when it is raining or the like at the time of capturing an image, the contour of the subject whose subject distance is long is caught unclear because of stagnation of air. In an example, the detecting section 14 estimates the subject distance to be farther when the weather is sunny than when it is raining or the like, even under the same condition of spatial frequency, when estimating the subject distance based on the spatial frequency of the contour of the subject.

In addition to or instead of the obtained meteorological condition, the detecting section 14 according to this modification example may detect the subject distance in each region in the captured image according to the position information obtained by the position information obtaining section 32. For example, depending on where the image capturing is conducted, the air may be clear or stagnate. Where the air is clear (for example other regions than urban area), the contour of the subject whose subject distance is long is captured clear. Conversely, where the air is not clear (e.g., urban area), the contour of the subject whose subject distance is long is captured unclear. Therefore, the detecting section 14 can estimate the subject distance to be farther if the image capturing place has a clear air (e.g., other regions than urban area) than the image capturing place having a dirty air (e.g., urban area) even under the same condition of spatial frequency, when estimating the subject distance based on the spatial frequency of the contour of the subject.

In the above-stated manner, the image processing apparatus 10 according to this modification example can detect the subject distance more accurately, and accurately enhance the perspective of the captured image.

The detecting section 14 according to this modification example may also detect the subject distance in each region of a plurality of captured images, based on a plurality of images captured in different settings of focus distance to the same subject. In this case, the detecting section 14 may detect the region that is focused in the screen for each of the plurality of captured images. Then, the detecting section 14 estimates the subject distance of the region that is focused in the screen, from the focus distances of the plurality of captured images. Accordingly, the detecting section 14 can generate distance information just as the depth map even when there is no distance information included in the captured image.

The detecting section 14 according to this modification example may also detect the subject distance in each region of a plurality of captured images, based on a plurality of images captured in different settings of diaphragm. In this case, the range of the plurality of captured images that is focused in the screen gradually widens as the state changes from the opened diaphragm to the closed diaphragm. With this in view, in an example, the detecting section 14 estimates the subject distance of each region in the screen, by comparing the ranges that are focused in the screen in each of a plurality of captured images. Accordingly, the detecting section 14 can generate distance information just as the depth map even when there is no distance information included in the captured image.

Figure 6:
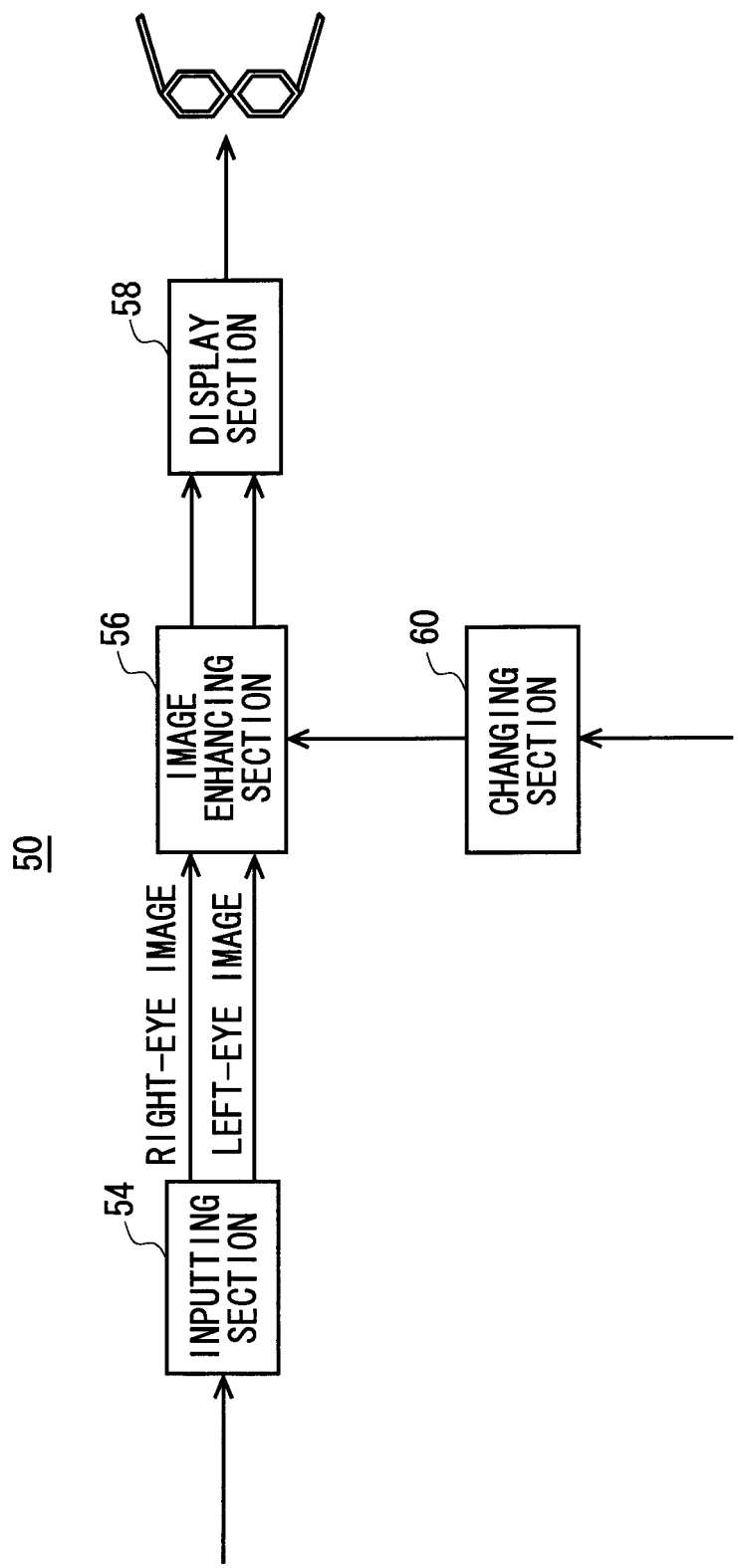
FIG. 6 shows a configuration of a display apparatus 50 according to a second embodiment.

FIG. 6 shows a configuration of a display apparatus 50 according to a second embodiment. The display apparatus 50 displays an image that gives the observer a stereoscopic perspective. In the second embodiment, the display apparatus 50 displays a right-eye image to be provided to the right eye of an observer, and a left-eye image to be provided to the left eye of the observer, as an image that give the observer a stereoscopic perspective. The right-eye image and the left-eye image are images that have parallax in a right and left direction, which gives a stereoscopic appearance when they are provided to the observer.

The display apparatus 50 includes an inputting section 54, an image enhancing section 56, a display section 58, and a changing section 60. The inputting section 54 inputs, from outside, an image that gives a stereoscopic appearance when it is looked by an observer. The inputting section 54 inputs an image reproduced from a recording medium or an image resulting from being demodulated from a broadcast signal. In this example, the inputting section 54 inputs a right-eye image to be provided to the right eye of an observer, and a left-eye image to be provided to the left eye of the observer.

The image enhancing section 56 performs image processing on the image inputted by the inputting section 54, and either enhances or turns down the stereoscopic appearance that would be felt by an observer. Note that when there is no enhancement setting function in the image enhancing section 56, the image enhancing section 56 may output the image inputted by the inputting section 54 as it is without performing any image processing.

The display section 58 displays an image received from the image enhancing section 56, the image giving a stereoscopic appearance when it is looked by an observer. In the present embodiment, the display section 58 displays a right-eye image and a left-eye image, as an image that gives a stereoscopic appearance when it is observed by an observer.

An exemplary display section 58 includes a monitor and special glasses. The monitor displays the right-eye image and the left-eye image. The special glasses are designed to provide the right-eye image displayed on the monitor solely to the right eye of the observer, and the left-eye image displayed on the monitor solely to the left eye of the observer. Accordingly, the display section 58 can make the observer experience the stereoscopic perspective.

The changing section 60 changes the amount by which the stereoscopic perspective is enhanced in the image displayed by the display section 58, according to the setting of the observer. Specifically, the changing section 60 changes the parameter for image processing used by the image enhancing section 56, thereby controlling the amount of enhancement for the stereoscopic perspective.

In an example, the image enhancing section 56 either enhances or turns down the stereoscopic perspective of an image, by performing the following image processing.

When the subject distance is long when capturing an image of a landscape, the image takes on more blue component than an original subject color, due to the effect of the air layer interposed between the camera and the subject. Therefore, for enhancing the stereoscopic perspective, the image enhancing section 56 increases the blue component ratio of the image depending on the subject distance. Conversely, for turning down the stereoscopic perspective, the image enhancing section 56 decreases the blue component ratio of the image depending on the subject distance. The image enhancing section 56 either increases or decreases the blue component ratio by a larger amount for a subject whose subject distance is longer. Accordingly, the image enhancing section 56 can enhance or turn down the stereoscopic perspective of a captured image.

In this case, the changing section 60 can change the amount of enhancement that the image enhancing section 56 gives to the blue component ratio for the subject, depending on the setting of the observer. In other words, the changing section 60 changes the amount by which the blue component ratio is increased or decreased, depending on the setting of the observer. Accordingly, the changing section 60 can change the stereoscopic perspective of the captured image according to the setting of the observer.

When the subject distance is long when capturing an image of a landscape, the image will be blurred compared to the actual contour of the subject, due to the effect of the air layer interposed between the camera and the subject. So as to enhance the stereoscopic perspective, the image enhancing section 56 can enlarge the blurring of the image depending on the subject distance. Conversely, for turning down the stereoscopic perspective, the image enhancing section 56 may reduce the blurring of the image depending on the subject distance. The image enhancing section 56 either increases or decreases the amount of blur for a subject whose subject distance is longer. Accordingly, the image enhancing section 56 can enhance or turn down the stereoscopic perspective of a captured image.

In this case, the changing section 60 can change the amount by which the image enhancing section 56 blurs a subject, depending on the setting of the observer. In other words, the changing section 60 changes the amount by which the image is blurred, depending on the setting of the observer. Accordingly, the changing section 60 can change the stereoscopic perspective of the captured image according to the setting of the observer.

In addition, by widening the distance between the right-eye image and the left-eye image, the convergence of the observer approaches parallel, to cause the subject to be felt farther. Therefore, so as to enhance the stereoscopic perspective, the image enhancing section 56 may increase the inter-image distance which is between the display position for the right-eye image and the display position for the left-eye image of the same subject, according to the subject distance of the subject. Conversely, for turning down the stereoscopic perspective, the image enhancing section 56 may shorten the inter-image distance depending on the subject distance. The image enhancing section 56 either increases or decreases the inter-image distance by a larger amount for a subject whose subject distance is longer. Accordingly, the image enhancing section 56 can enhance or turn down the stereoscopic perspective of a captured image.

In this case, the changing section 60 can change the amount by which the image enhancing section 56 enhances the inter-image distance for the subject, depending on the setting of the observer. In other words, the changing section 60 changes the amount by which the inter-image distance is increased or decreased depending on the setting of the observer. Accordingly, the changing section 60 can change the stereoscopic perspective of the captured image according to the setting of the observer.

As explained above, the display apparatus 50 can freely change the degree of stereoscopic perspective that the observer would feel from an image. Accordingly, the display apparatus 50 can provide a stereoscopic image with such a stereoscopic perspective that would be felt adequate by each observer.

FIG. 2 and FIG. 3 include a man (near view), a house (intermediate view), a mountain (distant view), and the sky (very distant view). The image shown in FIG. 2 is an example of the original captured image before the image enhancing section 56 according to the second embodiment gives image processing thereto. The image shown in FIG. 3 is an example of the original captured image after the image enhancing section 56 according to the second embodiment has given image processing thereto. In FIG. 3, the sign "x" shows the region in which the blue component ratio is increased.

For example, the image enhancing section 56 increases the blue component ratio for the mountain (distant view) and the sky (very distant view) contained in the image of FIG. 2. Furthermore, the image enhancing section 56 increases the blue component ratio by a larger amount for the region of the sky (very distant view) whose subject distance is longer, than for the region of the mountain (distant view).

Instead of or in addition to increasing the blue component ratio, the image enhancing section 56 may blur the mountain (distant view) and the sky (very distant view). The image enhancing section 56 may blur the region of the sky (very distant view) whose subject distance is longer by a greater amount than the region of the mountain (distant view).

The captured image processed by the image enhancing section 56 as described above can make an observer feel a greater difference in distance between the regions whose subject distance is near and the regions whose subject distance is long. This means that the image enhancing section 56 can enhance the perspective of the captured image without changing the contour or the structural outline of the subject in the image captured by the camera as they are.

Figure 7:
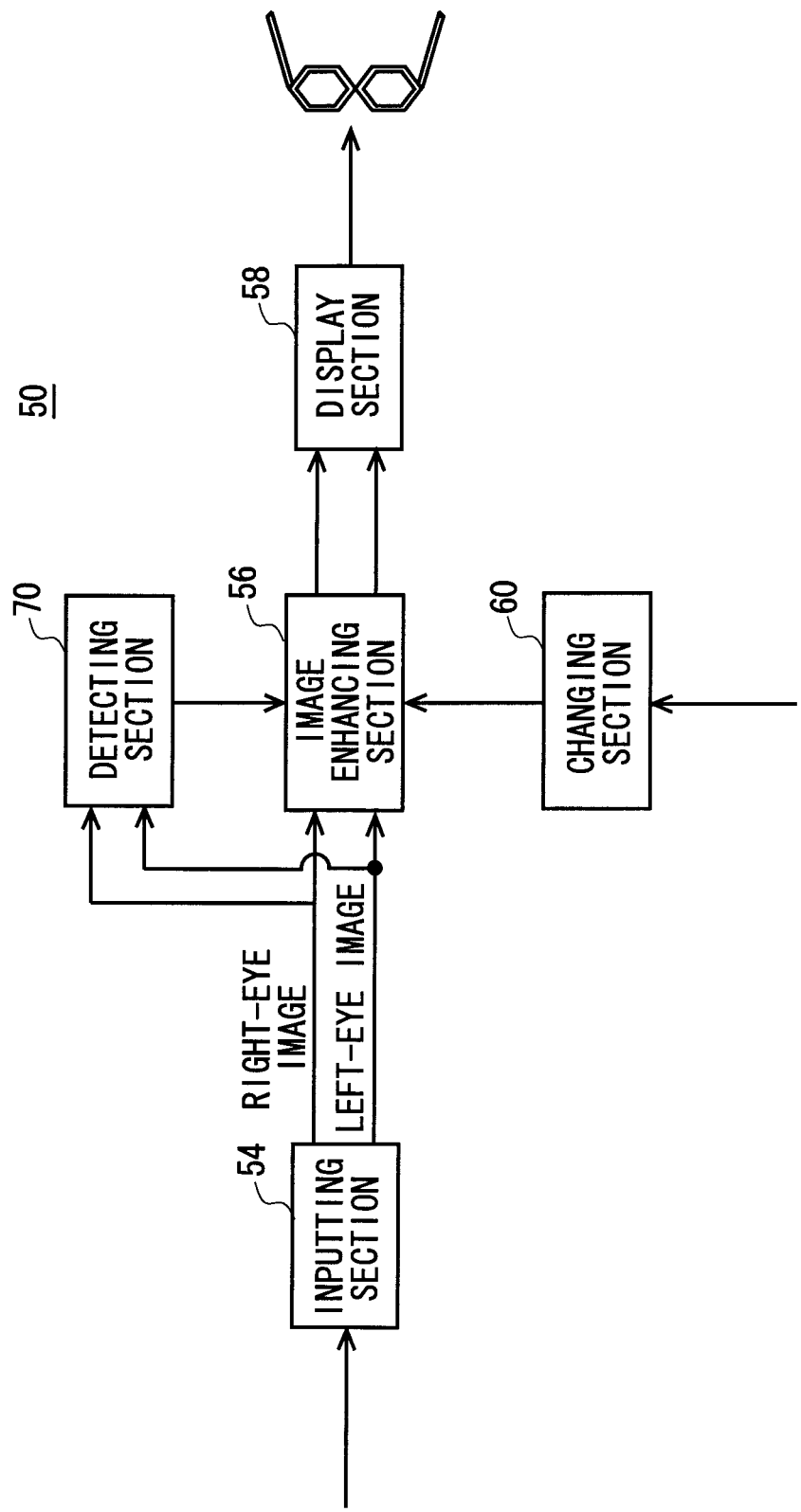
FIG. 7 shows a configuration of a display apparatus 50 according to a modification example of the second embodiment.

FIG. 7 shows a configuration of a display apparatus 50 according to a modification example of the second embodiment. The display apparatus 50 according to this modification example adopts substantially the same configuration and function as the display apparatus 50 shown in FIG. 6, and so the members having substantially the same configuration and function as in FIG. 6 are assigned the same reference numerals, and the following description focuses on the differences.

The display apparatus 50 according to this modification example further includes a detecting section 70. The detecting section 70 detects the subject distance for each region of the image to be displayed by the display section 58.

For example, the detecting section 70 detects the inter-image distance between the display position for the right-eye image and the display position for the left-eye image of the same subject. When people observe an object that is positioned far, the angle of convergence between the right eye and the left eye narrows than when an object that is positioned near is observed. Therefore, the inter-image distance between the display position for the right-eye image and the display position for the left-eye image of the same subject widens as the increase in subject distance. Therefore, the detecting section 70 can estimate the subject distance of each region by detecting the inter-image distance in each region on a screen for the right-eye image and the left-eye image inputted by the inputting section 54.

In addition, in this modification example, the image enhancing section 56 can enlarge the amount of enhancement of the stereoscopic perspective by enlarging the difference between the image display distance in the image displayed by the display section 58 for a portion in which the difference in the subject distance detected by the detecting section 70 is larger. Accordingly, the image enhancing section 56 can pursue the enhancement processing step by step according to the subject distance.

In this modification example, the changing section 60 may conduct calibration prior to display of an image. Specifically, the changing section 60 can display the image from which a different stereoscopic perspective is expected, and calibrate it to enable an observer to select the amount of enhancement that he desires on the stereoscopic perspective of his image on the display section 58.

After calibration, the image enhancing section 56 enhances the image outputted from the inputting section 54, according to the amount of enhancement on the stereoscopic perspective selected by the observer. Then, the display section 58 displays the image enhanced by the image enhancing section 56. Accordingly, the changing section 60 can observe the image with a stereoscopic perspective adequate for the observer.

Additionally, the display apparatus 50 according to the second embodiment can further include a function of the image processing apparatus 10 according to the first embodiment. Accordingly, the display apparatus 50 according to the second embodiment can provide a stereoscopic image with such a stereoscopic perspective that would be felt adequate by each observer.

Figure 8:
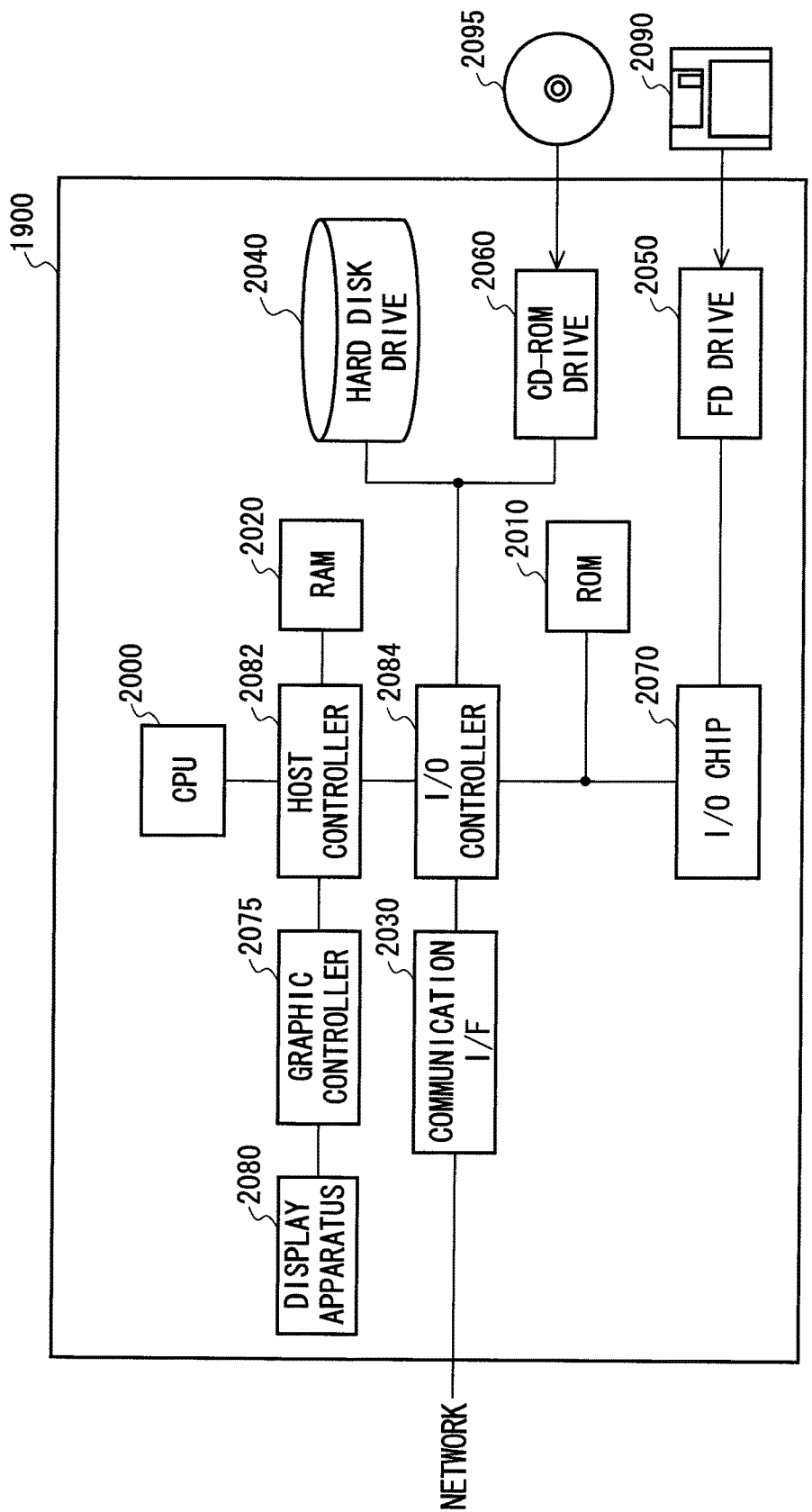
FIG. 8 shows an exemplary hardware configuration of a computer 1900 according to the present embodiment.

FIG. 8 shows an exemplary configuration of a computer 1900 according to the present embodiment. The computer 1900 according to the present embodiment is equipped with a CPU periphery that includes a CPU 2000, a RAM 2020, a graphics controller 2075, and a display apparatus 2080 which are mutually connected by a host controller 2082. The computer 1900 is also equipped with an input/output unit having a communication interface 2030, a hard disk drive 2040, and a CD-ROM drive 2060 which are connected to the host controller 2082 via an input/output controller 2084, and a legacy input/output unit having a ROM 2010, a flexible disk drive 2050, and an input/output chip 2070 which are connected to the input/output controller 2084.

The host controller 2082 connects the RAM 2020 with the CPU 2000 and the graphics controller 2075 which access the RAM 2020 at a high transfer rate. The CPU 2000 operates according to programs stored in the ROM 2010 and the RAM 2020, thereby controlling each unit. The graphics controller 2075 obtains image data generated by the CPU 2000 or the like on a frame buffer provided in the RAM 2020, and causes the image data to be displayed on the display apparatus 2080. Alternatively, the graphics controller 2075 may contain therein a frame buffer for storing image data generated by the CPU 2000 or the like.

The input/output controller 2084 connects the host controller 2082 with the communication interface 2030, the hard disk drive 2040, and the CD-ROM drive 2060, which are relatively high-speed input/output apparatuses. The communication interface 2030 communicates with other apparatuses via a network. The hard disk drive 2040 stores a program and data used by the CPU 2000 within the computer 1900. The CD-ROM drive 2060 reads the program or the data from the CD-ROM 2095, and provides the hard disk drive 2040 with the program or the data via the RAM 2020.

The ROM 2010, and the flexible disk drive 2050 and the input/output chip 2070 which are relatively low-speed input/output apparatuses are connected to the input/output controller 2084. The ROM 2010 stores therein a boot program executed by the computer 1900 at the time of activation, a program depending on the hardware of the computer 1900, or the like. The flexible disk drive 2050 reads the programs or data from a flexible disk 2090, and provides the hard disk drive 2040 with the programs or data via the RAM 2020. The input/output chip 2070 connects a flexible drive 2050 to an input/output controller 2084, and connects various input/output apparatuses via a parallel port, a serial port, a keyboard port, a mouse port, and the like to the input/output controller 2084.

A program to be provided for the hard disk drive 2040 via the RAM 2020 is provided by a user by being stored in such a recording medium as the flexible disk 2090, the CD-ROM 2095, and an IC card. The program is read from the recording medium, installed into the hard disk drive 2040 within the computer 1900 via the RAM 2020, and executed in the CPU 2000.

A program that is installed in the computer 1900 and causes the computer 1900 to function as the image processing apparatus 10 according to the first embodiment includes an inputting module, a detecting module, a distance information obtaining module, an image processing module, and an outputting module. The program or module acts on the CPU 2000, to cause the computer 1900 to function as an inputting section 12, a detecting section 14, a distance information obtaining section 16, an image processing section 18, and an outputting section 20.

The information processing described in these programs is read into the computer 1900, to function as an inputting section 12, a detecting section 14, a distance information obtaining section 16, an image processing section 18, and an outputting section 20, which are the concrete means as a result of cooperation between the software and the above-mentioned various types of hardware resources. Moreover, the image processing apparatus 10 for the usage is constituted by realizing the operation or processing of information in accordance with the usage of the computer 1900 of the present embodiment by these concrete means.

The program installed in the computer 1900 and causing the computer 1900 to function as the display apparatus 50 according to the second embodiment includes an inputting module, an image enhancing module, a display module, and a changing module. The program or module operates on the CPU 2000 or the like, to cause the computer 1900 to function as an inputting section 54, an image enhancing section 56, a display section 58, and a changing section 60.

The information processing described in these programs is read into the computer 1900, to function as an inputting section 54, an image enhancing section 56, a display section 58, and a changing section 60, which are the concrete means as a result of cooperation between the software and the above-mentioned various types of hardware resources. Moreover, the display apparatus 50 for the usage is constituted by realizing the operation or processing of information in accordance with the usage of the computer 1900 of the present embodiment by these concrete means.

For example when communication is performed between the computer 1900 and an external apparatus and the like, the CPU 2000 executes a communication program loaded onto the RAM 2020, to instruct communication processing to a communication interface 2030, based on the processing described in the communication program. The communication interface 2030, under control of the CPU 2000, reads the transmission data stored on the transmission buffering region provided in the recording apparatus such as a RAM 2020, a hard disk drive 2040, a flexible disk 2090, or a CD-ROM 2095, and transmits the read transmission data to a network, or writes reception data received from a network to a reception buffering region or the like provided on the recording apparatus. In this way, the communication interface 2030 may exchange transmission/reception data with the recording apparatus by a DMA (direct memory access) method, or by a configuration that the CPU 2000 reads the data from the recording apparatus or the communication interface 2030 of a transfer destination, to write the data into the communication interface 2030 or the recording apparatus of the transfer destination, so as to transfer the transmission/reception data.

In addition, the CPU 2000 causes all or a necessary portion of the file of the database to be read into the RAM 2020 such as by DMA transfer, the file or the database having been stored in an external recording apparatus such as the hard disk drive 2040, the CD-ROM drive 2060 (CD-ROM 2095), the flexible disk drive 2050 (flexible disk 2090), to perform various types of processing onto the data on the RAM 2020. The CPU 2000 then writes back the processed data to the external recording apparatus by means of a DMA transfer method or the like. In such processing, the RAM 2020 can be considered to temporary store the contents of the external recording apparatus, and so the RAM 2020, the external recording apparatus, and the like are collectively referred to as a memory, a storage section, or a recording apparatus, and so on in the present embodiment. In the present embodiment, various types of information such as various types of programs, data, tables, and databases are stored in the recording apparatus, to undergo information processing. Note that the CPU 2000 may also retain a part of the RAM 2020, to perform reading/writing thereto on the cache memory. In such an embodiment, too, the cache is considered to be contained in the RAM 2020, the memory, and/or the recording apparatus unless noted otherwise, since the cache memory performs part of the function of the RAM 2020.

The CPU 2000 performs various types of processing, onto the data read from the RAM 2020, which includes various types of operations, processing of information, condition judging, search/replace of information, described in the present embodiment and designated by an instruction sequence of programs, and writes the result back to the RAM 2020. For example, when performing condition judging, the CPU 2000 judges whether each type of variables shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2000 can search for information in the file or database or the like in the recording apparatus. For example when a plurality of entries, each having an attribute value of a first attribute is associated with an attribute value of a second attribute, are stored in a recording apparatus, the CPU 2000 searches for an entry matching the condition whose attribute value of the first attribute is designated, from among the plurality of entries stored in the recording apparatus, and reads the attribute value of the second attribute stored in the entry, thereby obtaining the attribute value of the second attribute associated with the first attribute satisfying the predetermined condition.

The above-explained program or module can be stored in an external recording medium. Exemplary recording medium include a flexible disk 2090, a CD-ROM 2095, as well as an optical recording medium such as a DVD or a CD, a magneto-optic recording medium such as a MO, a tape medium, and a semiconductor memory such as an IC card. In addition, a recording apparatus such as a hard disk or a RAM provided in a server system connected to a dedicated communication network or the Internet can be used as a recording medium, thereby providing the program to the computer 1900 via the network.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

What is claimed is:

1. A display apparatus comprising:
    a processor that causes a computer to:
        display an image that gives a stereoscopic perspective to an observer;
        enhance or turn down the stereoscopic perspective of the image based upon detected distances of regions within the image; and
        change an amount by which the stereoscopic perspective in the image displayed is enhanced or turned down according to a stereoscopic perspective setting of the observer,
    wherein
    the changing performs calibration to enable the observer to select an amount of enhancement for the stereoscopic perspective, by displaying images, each image being the same subject but having stereoscopic perspectives that have been enhanced or turned down by different amounts, and
    the displaying displays an image according to the amount of enhancement for the stereoscopic perspective selected for the observer.

2. The display apparatus according to claim 1, wherein
    the enhancing of the stereoscopic perspective of the image includes increasing a blue component ratio larger for a subject whose subject distance is longer, and
    the changing changes the amount by which the enhancing enhances a blue component ratio with respect to a subject, according to the stereoscopic perspective setting of the observer.

3. The display apparatus according to claim 1, wherein
    the enhancing of the stereoscopic perspective of the image includes increasing a blur by a larger amount for a subject whose subject distance is longer, and
    the changing changes the amount by which the enhancing blurs a subject, according to the stereoscopic perspective setting of the observer.

4. The display apparatus according to claim 1, wherein
    the displaying displays a right-eye image to be provided for a right eye of the observer and a left-eye image to be provided for a left eye of the observer, as an image from which an observer perceives a stereoscopic perspective,
    the enhancing of the stereoscopic perspective includes increasing an inter-image distance between a display position for the right-eye image and a display position for the left-eye image by a larger amount for a subject whose subject distance is longer, and
    the changing changes the amount of an inter-image distance for a subject provided by the enhancing, according to the stereoscopic perspective setting of the observer.

5. The display apparatus according to claim 2, wherein
    the processor further causes the computer to detect a subject distance for each region of an image displayed, and
    the enhancing increases an amount of enhancement for the stereoscopic perspective in the image to be displayed for a portion whose subject distance is larger.

6. The display apparatus according to claim 2, wherein
    the displaying displays a right-eye image to be provided for a right eye of the observer and a left-eye image to be provided for a left eye of the observer, as an image from which an observer perceives a stereoscopic perspective,
    the processor further causes the computer to:
        detect the inter-image distance between a display position for the right-eye image and a display position for the left-eye image in a same subject; and wherein
    the enhancing increases an amount of enhancement for the stereoscopic perspective in the image to be displayed for a portion whose subject distance is larger.

7. A non-transitory computer readable recording medium storing therein a program causing a computer to function as a display apparatus described in claim 1.

8. The display apparatus according to claim 1, wherein
    the enhancing or the turning down of the stereoscopic perspective of the image includes changing a distance perspective of each of the regions of the detected distances of the regions.

9. A display method comprising:
    displaying an image from which an observer perceives a stereoscopic perspective;
    enhancing or turning down the stereoscopic perspective of the image based upon detected distances of regions within the image; and
    changing an amount by which the stereoscopic perspective in the image displayed is enhanced or turned down according to a stereoscopic perspective setting of the observer, wherein
    the changing includes performing calibration to enable the observer to select an amount of enhancement for the stereoscopic perspective, by displaying images, each image being the same subject but having stereoscopic perspectives that have been enhanced or turned down by different amounts, and
    the displaying includes displaying an image according to the amount of enhancement for the stereoscopic perspective selected for the observer.

10. The display method according to claim 9, wherein
    the enhancing or the turning down of the stereoscopic perspective of the image includes changing a distance perspective of each of the regions of the detected distances of the regions.

* * * * *